(12) United States Patent
Sharma (10) Patent No.: US 9,250,738 B2
(45) Date of Patent: Feb. 2, 2016

(54) METHOD AND SYSTEM FOR ASSIGNING THE POSITION OF A TOUCHPAD DEVICE

(75) Inventor: Sanjeev Sharma, Ashburn, VA (US)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 13/031,821

(22) Filed: Feb. 22, 2011

(65) Prior Publication Data
US 2012/0212424 A1 Aug. 23, 2012

(51) Int. Cl.
*G06F 3/041* (2006.01)

(52) U.S. Cl.
CPC .................................. *G06F 3/0416* (2013.01)

(58) Field of Classification Search
USPC .......... 345/173–178; 178/18.01–18.09, 18.11
See application file for complete search history.

(56) References Cited

U.S. PATENT DOCUMENTS

| | | | |
|---|---|---|---|
| 5,864,105 A | 1/1999 | Andrews | |
| 6,392,637 B2 | 5/2002 | Liao et al. | |
| 6,507,338 B1 | 1/2003 | Liao et al. | |
| 6,518,957 B1 * | 2/2003 | Lehtinen et al. | 345/173 |
| 6,756,965 B2 * | 6/2004 | Combs et al. | 345/156 |
| 2001/0048429 A1 * | 12/2001 | Liao et al. | 345/173 |
| 2006/0038774 A1 | 2/2006 | Mese et al. | |
| 2007/0182722 A1 | 8/2007 | Hotelling et al. | |
| 2007/0265031 A1 * | 11/2007 | Koizumi et al. | 455/556.1 |
| 2007/0273656 A1 * | 11/2007 | Chang et al. | 345/169 |
| 2008/0117179 A1 * | 5/2008 | Noh | 345/173 |
| 2008/0297478 A1 | 12/2008 | Hotelling et al. | |
| 2009/0114518 A1 | 5/2009 | Lin et al. | |
| 2009/0146960 A1 | 6/2009 | Gim | |
| 2009/0174679 A1 | 7/2009 | Westerman | |
| 2010/0085317 A1 | 4/2010 | Park et al. | |
| 2010/0315368 A1 * | 12/2010 | Wong et al. | 345/173 |

FOREIGN PATENT DOCUMENTS

| | | |
|---|---|---|
| JP | 11327788 A | 11/1999 |
| KR | 20040103125 A | 12/2004 |

* cited by examiner

*Primary Examiner* — Srilakshmi K Kumar
*Assistant Examiner* — Jeffrey S Steinberg
(74) *Attorney, Agent, or Firm* — Douglas A. Lashmit; Hoffman Warnick LLC (57) ABSTRACT

Aspects of the invention are directed to a method and system for assigning the position of a touchpad device. A method for assigning a position of a touchpad according to an embodiment includes: selectively dividing, by a user, a touchpad into a first section and a second section, wherein the first section of the touchpad is distinct from the second section of the touchpad; and setting the first section of the touchpad as an active touchpad area; wherein a contact on the active touchpad area is recognized as a user input, and wherein a contact on the second section of the touchpad is not recognized as a user input.

11 Claims, 7 Drawing Sheets

METHOD AND SYSTEM FOR ASSIGNING THE POSITION OF A TOUCHPAD DEVICE

TECHNICAL FIELD

The disclosure relates generally to input devices, and more particularly, to a method and system for assigning the position of a touchpad device.

BACKGROUND

Typical computer users are not proficient with "touch typing," which comprises typing without using the sense of sight to identify and find the keys on a keyboard. The most commonly used form of typing is "hunt and peck" typing (e.g., two-fingered typing). This method is slower than touch typing because instead of relying on the memorized position of keys on a keyboard, the typist is required to find each key by sight and move their fingers a greater distance.

Many computer users are eventually capable of obtaining fast typing speeds on a keyboard using hunt and peck type typing, without ever learning touch typing. One issue with hunt and peck typing is that it is not standard. For example, each user has their own idiosyncratic hunt and peck typing style that may involve the use of two or more fingers on one or both hands. Unfortunately, keyboards and associated touchpads, which have become ubiquitous, especially in virtually all laptops and on some stand-alone keyboards, are not designed with such non-standard users in mind.

A typical user, who has never taken a typing class, develops their own typing habits. Standard typing on a full QWERTY keyboard divides keys evenly between the right and left hands of the person typing. This ensures that the right hand interacts with the keys on the right half of the keyboard and the left hand interacts with the keys on the left half of the keyboard. This results in the hands never crossing over to the opposite, wrong side of the keyboard. Users who learn typing by developing their own method tend to favor using one hand over the other and do not isolate that hand to its "own half" of the keyboard. This creates an issue with keyboards that have a touchpad in or below the lower section of the keyboard.

One issue caused by the "crossing over" of hands occurs when the thumb or palm of the hand that is positioned on the wrong side of the keyboard accidently touches the touchpad. Such an accidental touch may cause the mouse cursor to be relocated to a new position on the screen, based on the location of where the mouse pointer was situated on the screen when the accidental touch occurred. This can result in issues ranging from typing in a document at the wrong location to inputting data in the wrong field in an application or form. To address this issue, some users have resorted to deactivating the touchpad on their laptops and using an external mouse.

SUMMARY

Aspects of the invention are directed to a method and system for assigning the position of a touchpad device. In accordance with embodiments of the invention, the position, size, and/or configuration of a touchpad is user assignable.

A first aspect of the invention provides a method for assigning a position of a touchpad, comprising: selectively dividing, by a user, a touchpad into a first section and a second section, wherein the first section of the touchpad is distinct from the second section of the touchpad; and setting the first section of the touchpad as an active touchpad area; wherein a contact on the active touchpad area is recognized as a user input, and wherein a contact on the second section of the touchpad is not recognized as a user input.

A second aspect of the invention provides an apparatus for assigning a position of a touchpad, comprising: a component for selectively dividing, by a user, a touchpad into a first section and a second section, wherein the first section of the touchpad is distinct from the second section of the touchpad; and a component for setting the first section of the touchpad as an active touchpad area; wherein a contact on the active touchpad area is recognized as a user input, and wherein a contact on the second section of the touchpad is not recognized as a user input.

A third aspect of the invention provides a computer program comprising program code embodied in at least one computer-readable storage medium, which when executed, enables a computer system to implement a method for assigning a position of a touchpad, the method comprising: selectively dividing, by a user, a touchpad into a first section and a second section, wherein the first section of the touchpad is distinct from the second section of the touchpad; and setting the first section of the touchpad as an active touchpad area; wherein a contact on the active touchpad area is recognized as a user input, and wherein a contact on the second section of the touchpad is not recognized as a user input.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

The drawings are intended to depict only typical aspects of the invention, and therefore should not be considered as limiting the scope of the invention. In the drawings, like numbering represents like elements between the drawings.

DETAILED DESCRIPTION

As indicated above, aspects of the invention are directed to a method and system for assigning the position of a touchpad device. As used herein, unless otherwise noted, the term "set" means one or more (i.e., at least one) and the phrase "any solution" means any now known or later developed solution.

Figure 1:
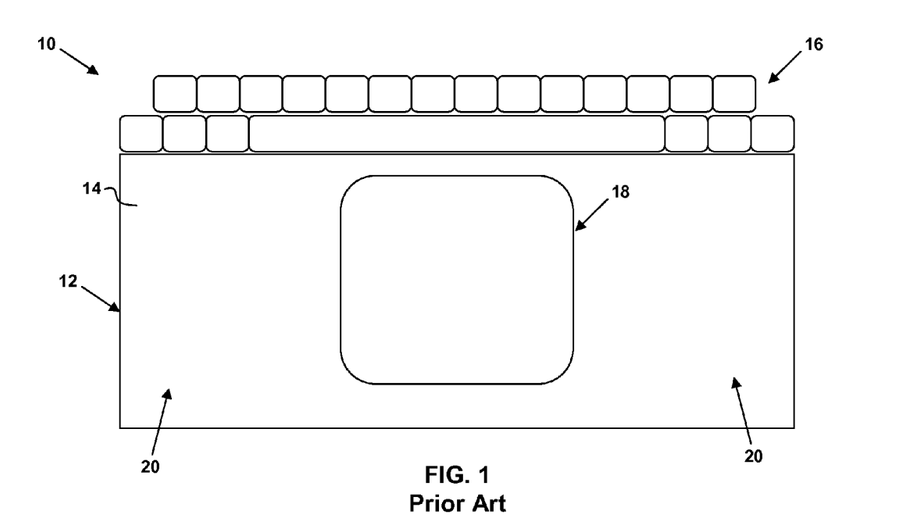
FIG. 1 depicts a portion of a device including a keyboard and touchpad in accordance with the prior art.

FIG. 1 depicts a portion of a device 10 (e.g., a laptop computer, stand-alone keyboard, etc.) including a keyboard and touchpad in accordance with the prior art. Such a device 10 generally includes a base portion 12 having an upper surface 14 on which input devices are located. The input devices may include, for example, a keyboard 16 for inputting data and commands, and a touchpad 18 for controlling a position of a cursor on a display (not shown). Wrist support areas 20 are typically provided on the upper surface 14 of the base portion 12 on either side of the touchpad 18. In this prior art device 10, the entirety of the surface of the touchpad 18 is "active" such that the touch of a user's finger(s), palm, wrist, etc., whether intentional or not, is detected and influences the position of a cursor on a corresponding display.

Figure 2:
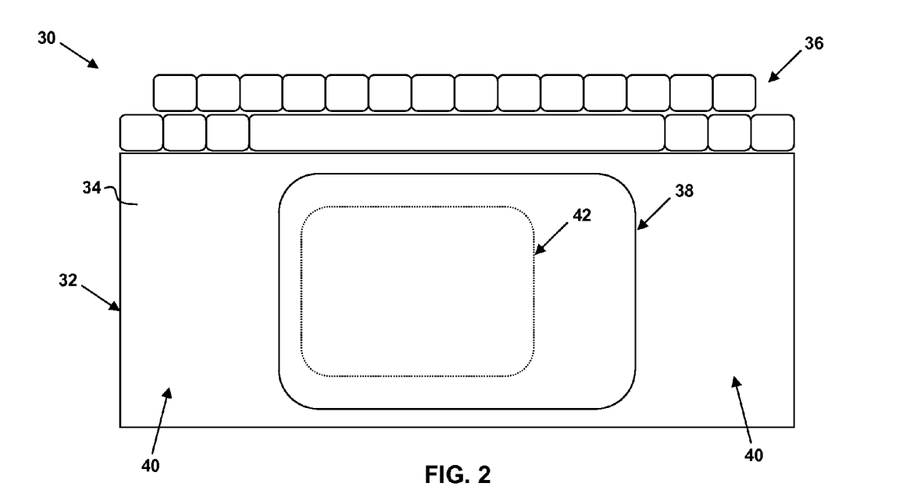
FIG. 2 depicts a portion of a device including a keyboard and touchpad in accordance with an embodiment of the present invention.

FIG. 2 depicts a portion of a device 30 (e.g., a laptop computer, stand-alone keyboard, etc.) including a keyboard and touchpad in accordance with an embodiment of the present invention. Similar to the device 10 shown in FIG. 1, the device 30 generally includes a base portion 32 having an upper surface 34 on which input devices are located. The input devices may include, for example, a keyboard 36 for inputting data and commands, and a touchpad 38 for controlling a position of a cursor on a display (not shown). Wrist support areas 40 are provided on the upper surface 34 of the base portion 32 on either side of the touchpad 38. Similar to the touchpad 18, the entirety of the surface of the touchpad 38 is initially active such that a contact by a user is detected and influences the position of a cursor on a corresponding display. Unlike the touchpad 18, however, and as described in greater detail below, a user can select a section of the touchpad 38 as an active touchpad area, effectively "deactivating" the non-selected section(s) of the touchpad 38.

Comparing the touchpad 38 in FIG. 2 and the touchpad 18 in FIG. 1, it can be seen that the touchpad 38 has a larger surface area than the touchpad 18. To this extent, in accordance with an embodiment of the present invention, a user of the device 30 can select a section of the touchpad 38 as an active touchpad area 42, based on a position, shape, and/or size of their choosing. The selection of the active touchpad area 42 can be achieved using several different techniques, including via a user interface (UI). In general, the touchpad 38 has a surface area that is at least as large as the surface area of the touchpad 18. In another embodiment, the touchpad 38 can extend across substantially an entire width of the device 30.

Figure 3:
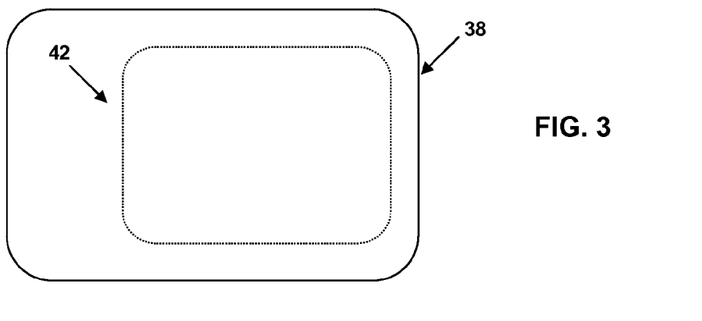
FIGS. 3-6 depict examples of the repositioning, resizing, and/or reconfiguring of an active touchpad area of a touchpad according to embodiments.
Figure 4:
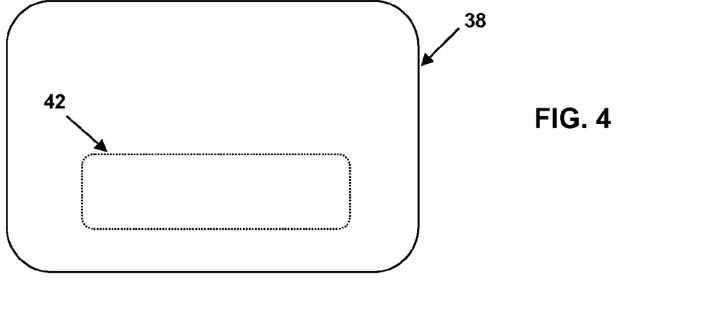
Figure 5:
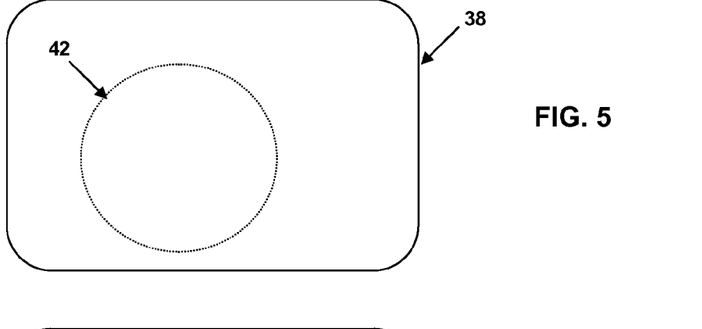
Figure 6:
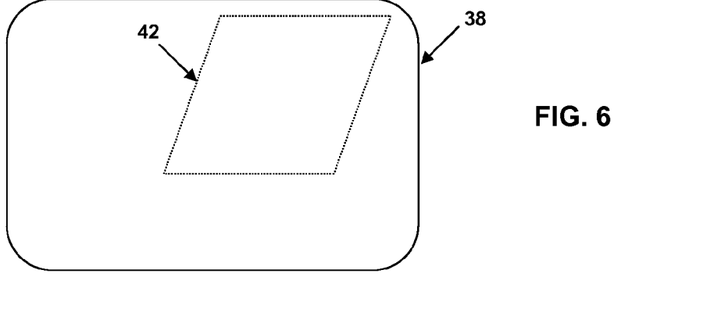

The user selection of the active touchpad area 42 of the touchpad 38 allows the user to reposition (e.g., left or right of center and/or higher or lower), reshape, and/or resize the active touchpad area 42 of the touchpad 38. For example, a user may reposition the active touchpad area 42 based on which hand typically "crosses over" to the wrong half of the keyboard 36. For instance, a user who is right handed and favors their right hand may reposition the active touchpad area 42 slightly left of center of the touchpad 38 as shown in FIG. 2 to minimize accidental touches on the right side of the touchpad 38. Similarly, as depicted in FIG. 3, a user who is left handed and favors their left hand may reposition the active touchpad area 42 slightly right of center of the touchpad 38 to minimize accidental touches on the left side of the touchpad 38. FIGS. 4-6 depict additional examples of the repositioning, reshaping, and/or resizing of the active touchpad area 42 of the touchpad 38 to reduce accidental touches on the touchpad 38 according to embodiments. Although particular examples of the repositioning, reshaping, and/or resizing of the active touchpad area 42 of the touchpad 38 have been shown and described herein, it should be clear that almost any type of repositioning, reshaping, and/or resizing is possible. To this extent, the examples provided herein are not intended to be limiting in any way.

Figure 7:
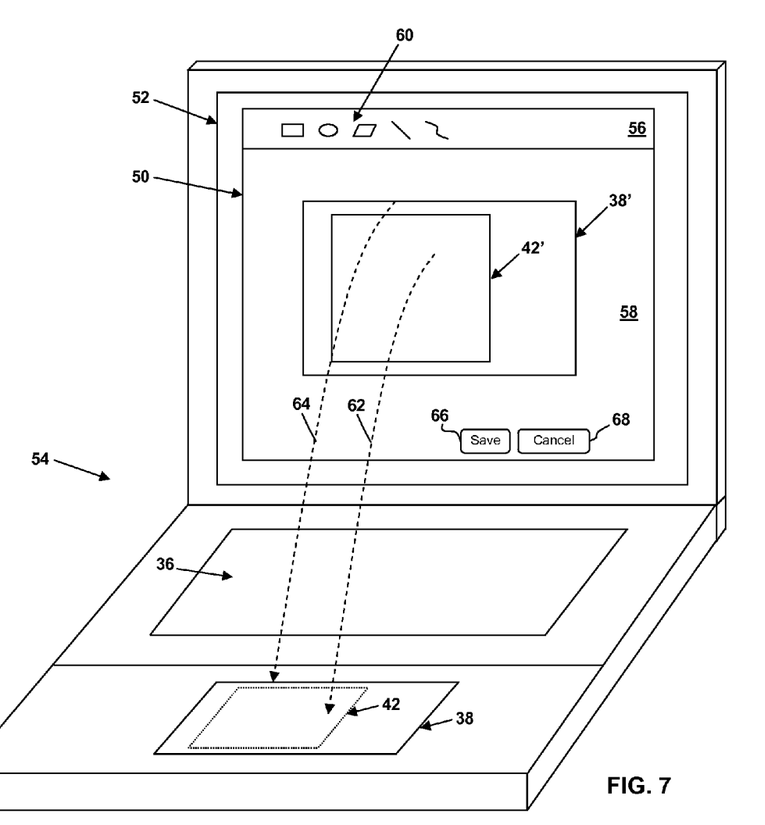
FIG. 7 depicts an illustrative user interface (UI) for repositioning, resizing, and/or reconfiguring an active touchpad area of a touchpad according to an embodiment.

FIG. 7 depicts an illustrative user interface (UI) 50 that allows a user to selectively reposition, reshape, and/or resize an active touchpad area 42 of a touchpad 38 according to an embodiment. The UI 50 is displayed on a display 52 of a device 54 (e.g., a laptop computing device) that includes, or is connected to, an input device including the touchpad 38 (with or without an associated keyboard 36). As shown, the UI 50 includes a menu bar 56 and a display area 58.

The menu bar 56 includes a plurality of drawing/editing tools 60 (and/or corresponding menu items) that can be employed by a user to generate and control the position, shape, and size of the active touchpad area 42 of the touchpad 38. As depicted in FIG. 7, a user can use the drawing tools 60 to draw a representation 42' of a desired active touchpad area on a representation 38' of a touchpad displayed in the UI 50. The representation 42' of the active touchpad area can subsequently be manipulated (e.g., moved, resized, reshaped, etc.) using the drawing tools 60 until the user is satisfied with the position, size, and shape of the representation 42' of the active touchpad area within the representation 38' of the touchpad displayed in the UI 50. For example, the representation 42' of the active touchpad area can be selected and/or dragged to a particular position within the representation 38' of the touchpad displayed in the UI 50 using a mouse, arrow keys, and/or the like. The shape and/or size of the representation 42' of the active touchpad area can be changed by using sizing handles and/or other suitable drawing manipulation tools.

Once the user is satisfied with the position, size, and shape of the representation 42' of the active touchpad area displayed in the UI 50, the user can activate the corresponding active touchpad area 42 of the touchpad 38 of the device 54 as indicated by the dashed lines 62 and 64, respectively. This can be accomplished, for example, by actuating a "save" button 66 in the UI 50. The user can cancel any changes to the representation 42' of the active touchpad area displayed in the UI 50 by actuating a "cancel" button 68. Other techniques for actuating the corresponding active touchpad area 42 of the touchpad 38 of the device 54 are also possible (e.g., keyboard shortcut, menu item, and/or the like).

A library of preconfigured representations 42' of the active touchpad area can also be provided to the user. For example, the user can be provided with a menu, toolbar, etc., displaying various possible representations 42' of the active touchpad area. The user can then select from the library which representation 42' of the active touchpad area he/she would like to use. The preconfigured representations 42' of the active touchpad area can be representations 42' previously designed and saved by the user, or representations 42' of the active touchpad area commonly employed by the user and/or other users. The representation 42' of the active touchpad area selected from the library by the user can be immediately transposed to a corresponding active touchpad area 42 of the touchpad 38 upon selection, or can be displayed in the UI 50 for editing by the user.

Figure 8:
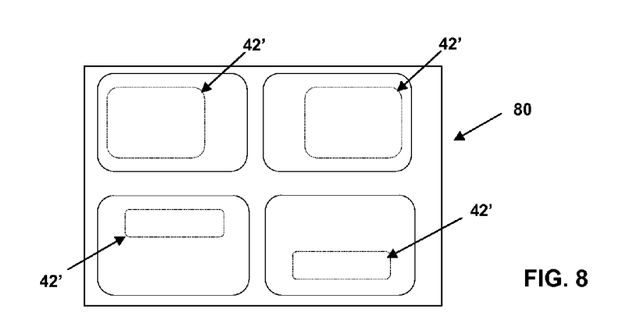
FIG. 8 depicts an illustrative drop-down toolbar displaying a plurality of user selectable preconfigured representations of an active touchpad area in accordance with an embodiment.

An illustrative drop-down toolbar 80 displaying a plurality of user selectable preconfigured representations 42' of the active touchpad area is depicted in FIG. 8. In response to a selection of one of the representations 42' of the active touchpad area by the user, the corresponding active touchpad area 42 of the touchpad 38 of the device 54 is activated and/or displayed in the UI 50.

Figure 9:
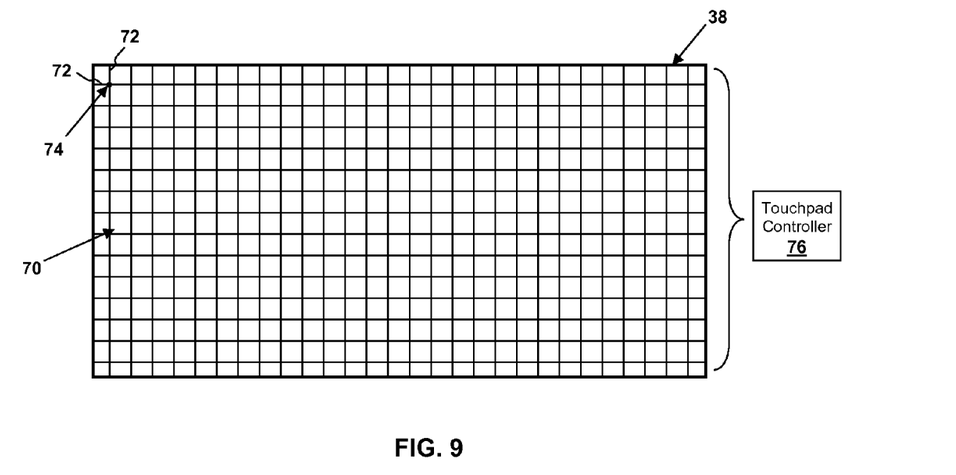
FIG. 9 depicts an illustrative grid of conductors and capacitance sensing nodes of a touchpad according to an embodiment.

Capacitive sensing is often used to determine the location of a finger or stylus on a touchpad (e.g., touchpad 38, FIG. 7). For example, as depicted in FIG. 9, a touchpad 38 utilizing capacitive sensing generally employs a grid 70 of conductors 72 that form a plurality of capacitance sensing nodes 74. When a virtual ground, such as a finger or stylus, is placed over one or more of the capacitance sensing nodes 74, a change in the capacitance at that location is detected by a touchpad controller 76. Based on the capacitive changes, the touchpad controller 76 determines the contact location (or locations for finger gestures) and sends an input signal to a host device having a display screen (e.g., display 52 of device 54 (FIG. 7)) to control the movement/position of a cursor on the display screen of the host device.

Figure 10:
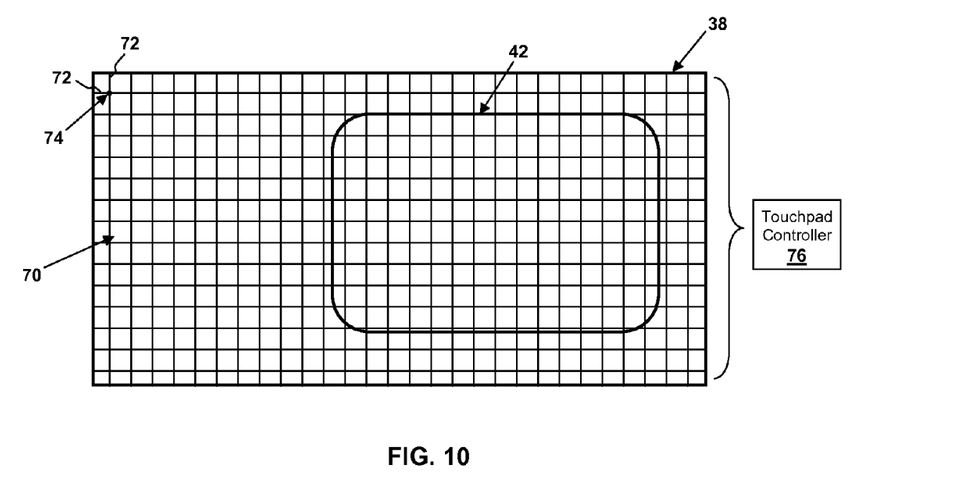
FIG. 10 depicts the grid of FIG. 9 after a user has selected an active touchpad area of the touchpad according to an embodiment.

FIG. 10 depicts the grid 70 of FIG. 9 after a user has selected an active touchpad area 42 of the touchpad 38 via the UI 50 (FIG. 7). In accordance with an embodiment, details (e.g., position, size, shape, etc.) of the representation 42' of the active touchpad area displayed in the UI 50 are provided to the touchpad controller 76. Based on the details of the representation 42' of the active touchpad area, the touchpad controller 76 selectively ignores any contact on the grid 70 of the touchpad 38 occurring outside of the corresponding active touchpad area 42 (e.g., the non-selected area of the touchpad 38 is rendered "in-active"). To this extent, the touchpad controller 76 only recognizes contact on the grid 70 of the touchpad 38 occurring within the active touchpad area 42 set by the user.

Figure 11:
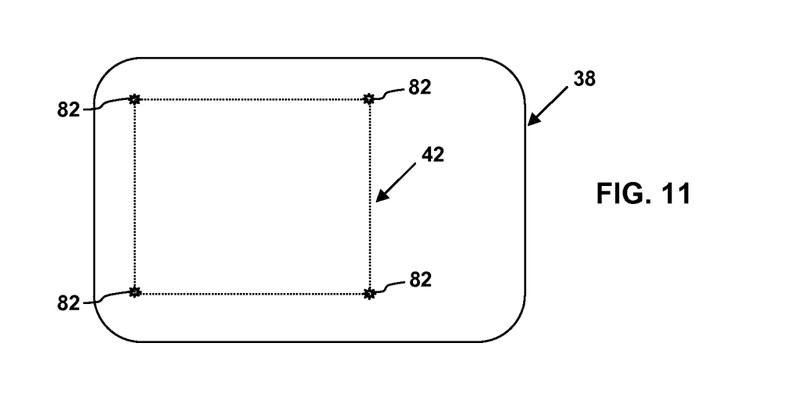
FIGS. 11-13 depict illustrative applications of a set of lighting elements to delineate an active touchpad area of a touchpad in accordance with embodiments.
Figure 12:
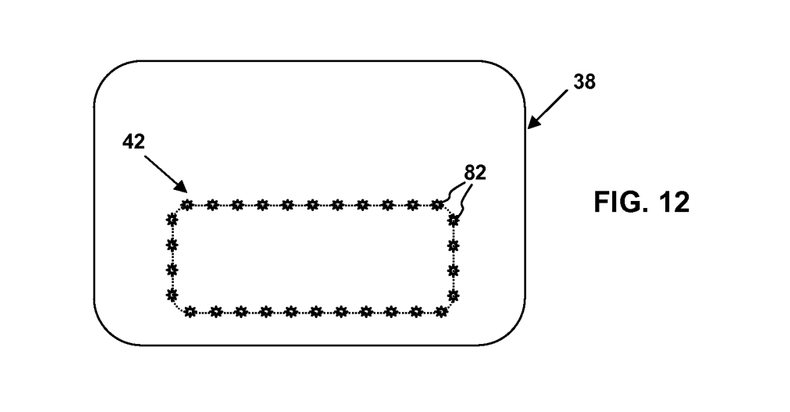
Figure 13:
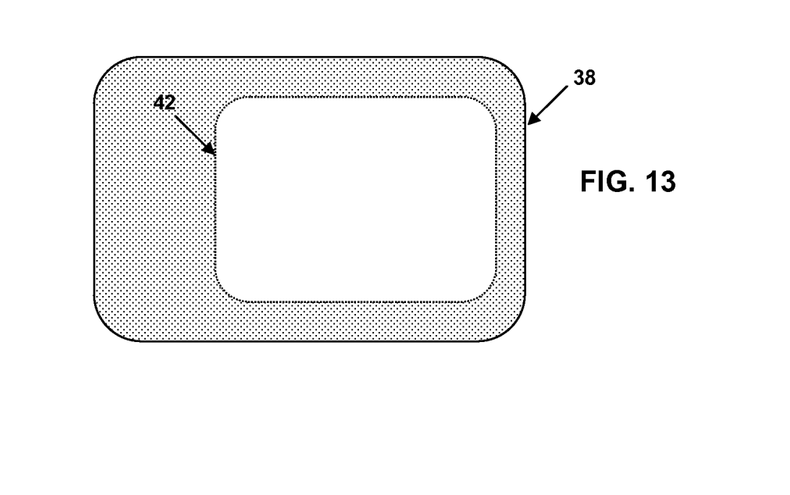

In embodiments of the invention, as depicted in FIGS. 11-13, the active touchpad area 42 can be delineated from the larger touchpad 38 using a set of lighting elements 82. The lighting elements 82 can be light emitting diodes (LEDs) or other suitable lighting devices. The lighting elements may be built into one of the layers forming the touchpad 38 and may be selectively actuated by the touchpad controller 76 based on the details of the representation 42' of the active touchpad area input by the user via the UI 50. This allows the user to easily visualize the size, position, and/or shape of the active touchpad area 42 of the touchpad 38.

The lighting elements 82 can be selectively actuated by the touchpad controller 76 to define distinct points of the active touchpad area 42. In FIG. 11, for example, the corners of a rectangular active touch pad area 42 are illuminated. In another embodiment, a larger number of lighting elements 82 can be selectively actuated by the touchpad controller 76 to define the periphery of the active touchpad area 42. An example of this embodiment is depicted in FIG. 12. In yet another embodiment, as depicted in FIG. 13, the lighting elements (not shown) are configured to illuminate the entire area of the active touchpad area 42 such that the user can easily distinguish the active touchpad area 42 of the touchpad 38 from the non-active, unlit areas (e.g., shaded area in FIG. 13) of the touchpad 38.

Figure 14:
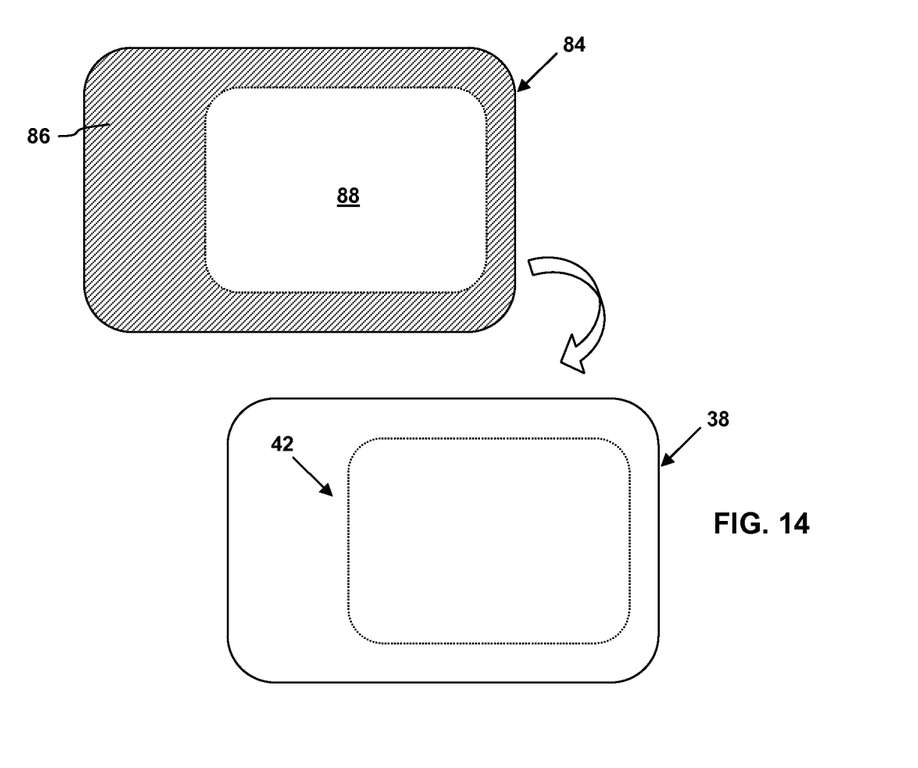
FIG. 14 depicts a removable template for identifying and/or defining an active touchpad area of a touchpad in accordance with an embodiment.

In another embodiment, as depicted in FIG. 14, a user can apply a removable template 84 to the touchpad 38 to identify and/or define the active touchpad area 42 of the touchpad 38. The removable template 84 may be formed of one or more layers of one or more suitable materials 86 that prevents user contact from being detected on the touchpad 38, and an opening 88 that allows user contact on the touchpad 38. The removable template 84 can be applied to the touchpad 38 by the user after the user has defined the active touchpad area 42 of the touchpad 38 via the UI 50. A plurality of different sizes/shapes of removable templates 84 can be provided for selection and application by the user.

In yet another embodiment, the removable template 84 itself can be used to define the active touchpad area 42 on the touchpad 38. In this case, the removable template 84 may be formed of one or more layers of one or more suitable materials that can be sensed by the touchpad controller 76 after the removable template 84 has been applied to the touchpad 38 by the user. To this extent, the touchpad controller 76 can be configured to ignore user contact that occurs outside of the opening 88 of the removable template 84, and to sense user contact on the touchpad 38 that occurs within the opening 88 of the removable template 84 that defines the active touchpad area 42.

Figure 15:
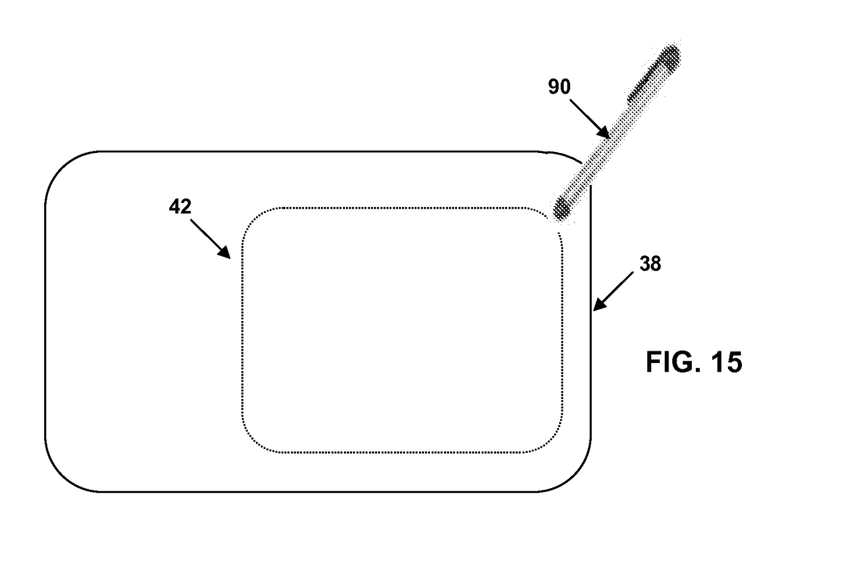
FIG. 15 depicts an illustrative input device for defining and/or identifying an active touchpad area of a touchpad according to an embodiment.

In another embodiment, as shown in FIG. 15, a user can use an input device 90, such as a stylus, finger, erasable marker, and/or the like, to define and/or identify the active touchpad area 42 of the touchpad 38. For example, the user can use the input device 90 to draw a closed shape (e.g., square, rectangle, circle, oval, etc.) on the touchpad 38, wherein the interior of the shape represents the active touchpad area 42.

In an embodiment, the touchpad controller (e.g. touchpad controller 76, FIG. 10) is configured to sense the shape drawn by the user on the touchpad 38 and, in response, set the active touchpad area 42 of the touchpad 38 accordingly. For example, the touchpad controller 76 can be configured to ignore user contact that occurs outside of the active touchpad area 42 corresponding to the shape drawn by the user on the touchpad 38, and to sense user contact on the touchpad 38 that occurs within the active touchpad area 42. The shape drawn by the user on the touchpad 38 can be illustrated by a UI (e.g., UI 50, FIG. 7) to assist the user during the drawing. Alternatively or in addition, the shape drawn by the user on the touchpad 38 can be illuminated using lighting elements (e.g., lighting elements 82, FIGS. 11-13).

Figure 16:
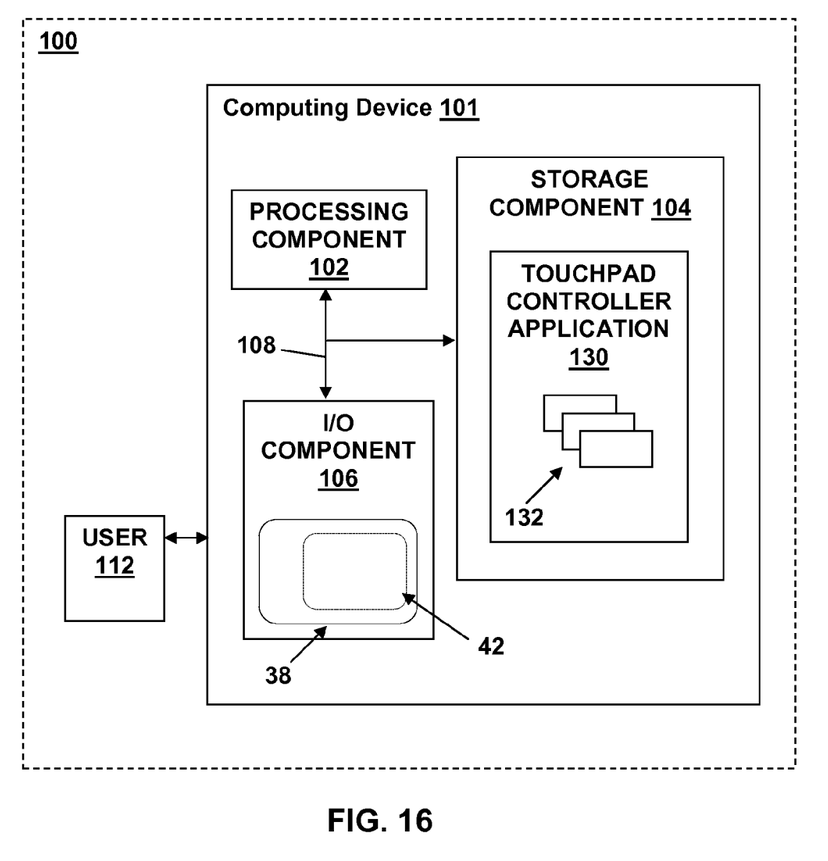
FIG. 16 depicts an illustrative computer environment for assigning a position of a touchpad device according to an embodiment.

FIG. 16 shows an illustrative environment 100 for assigning a position of a touchpad device according to an embodiment. To this extent, the environment 100 includes at least one computing device 101 that can perform various processes described herein.

The computing device 101 is shown including a processing component 102 (e.g., one or more processors), a storage component 104 (e.g., a storage hierarchy), an input/output (I/O) component 106 (e.g., one or more I/O interfaces and/or devices (e.g., keyboard, mouse, touchpad 38, display, etc.), and a communications pathway 108. In general, the processing component 102 executes program code, such as a touchpad controller application 130, which is at least partially fixed in the storage component 104. While executing program code, the processing component 102 can process data, which can result in reading and/or writing transformed data from/to the storage component 104 and/or I/O component 106 for further processing. The pathway 108 provides a communications link between each of the components in the computing device 101. The I/O component 106 can comprise one or more human I/O devices, which enable a user 112 to interact with the computing device 101 using any type of communications link. To this extent, the touchpad controller application 130 can manage a set of interfaces (e.g., graphical user interface(s), UI 50 (FIG. 7), application program interface(s), and/or the like) that enable the user 112 to interact with the touchpad controller application 130. Further, the touchpad controller application 130 can manage (e.g., store, retrieve, create, manipulate, organize, present, etc.) data using any solution.

In any event, the computing device 101 can comprise one or more general purpose computing articles of manufacture (e.g., computing devices) capable of executing program code, such as the touchpad controller application 130, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the touchpad controller application 130 can be embodied as any combination of system software and/or application software.

Further, the touchpad controller application 130 can be implemented using a set of modules 132. In this case, a module 132 can enable the computing device 101 to perform a set of tasks used by the touchpad controller application 130, and can be separately developed and/or implemented apart from other portions of the touchpad controller application 130. As used herein, the term "component" means any configuration of hardware, with or without software, which implements the functionality described in conjunction therewith using any solution, while the term "module" means program code that enables the computing device 101 to implement the actions described in conjunction therewith using any solution. When fixed in a storage component 104 of the computing device 101 that includes a processing component 102, a module 132 can be a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of the computing device 101.

It is understood that the computing device 101 is merely representative of various possible equivalent computer systems that may perform a process described herein. To this extent, in other embodiments, the functionality provided by the computing device 101 and the touchpad controller application 130 can be at least partially implemented by one or more computing devices that include any combination of general and/or specific purpose hardware with or without program code. In each embodiment, the hardware and program code, if included, can be created using standard engineering and programming techniques, respectively.

While performing a process described herein, the computing device 101 can communicate with one or more other computer systems using any type of communications link. The communications link can comprise any combination of various types of wired and/or wireless links; comprise any combination of one or more types of networks; and/or utilize any combination of various types of transmission techniques and protocols.

As discussed herein, the touchpad controller application 130 enables the computing device 101 to assigning an active touchpad area 42 of a touchpad 38. The computing device 101 can obtain data used by the touchpad controller application 130 using any solution. For example, the computing device 101 can generate and/or be used to generate data, retrieve/send data from/to one or more data stores, receive/send data from/to another system, and/or the like.

While shown and described herein as a method and system for assigning an active touchpad area of a touchpad, it is understood that aspects of the invention further provide various alternative embodiments. For example, in one embodiment, the invention provides a computer program fixed in at least one computer-readable medium, which when executed, enables a computing device to assign an active touchpad area of a touchpad. To this extent, the computer-readable medium includes program code, such as the touchpad controller application 130, which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the invention provides a method of providing a copy of program code, such as the touchpad controller application 130, which implements some or all of a process described herein. In this case, a computer system can process a copy of program code that implements some or all of a process described herein to generate and transmit, for reception at a second, distinct location (e.g., a mobile device, a computer system, etc.), a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system, a mobile device, etc., receiving the set of data signals described herein, and translating the set of data signals into a copy of the computer program fixed in at least one computer-readable medium. In either case, the set of data signals can be transmitted/received using any type of communications link.

It is understood that aspects of the invention can be implemented as part of a business method that performs a process described herein on a subscription, advertising, and/or fee basis. For example, the service provider can manage (e.g., create, maintain, support, etc.) a computer system and/or mobile device, that performs a process described herein for one or more customers. In return, the service provider can receive payment from the customer(s) under a subscription and/or fee agreement, receive payment from the sale of advertising to one or more third parties, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for assigning a position of a touchpad on a computing device, the computing device including the touchpad, a display, and a physical keyboard separating the touchpad from the display, comprising:

selectively dividing the touchpad into a first physical section and a second physical section, wherein the first physical section of the touchpad is distinct from the second physical section of the touchpad, and wherein the first physical section of the touchpad is surrounded by the second physical section of the touchpad;

setting the first physical section of the touchpad as an active touchpad area; and setting the second physical section of the touchpad as an inactive touchpad area;

wherein the selectively dividing the touchpad into the first physical section and the second physical section further comprises:

displaying on the display of the computing device a virtual representation of the first physical section of the touchpad within a virtual representation of the second physical section of the touchpad; and selecting and adjusting a position, shape, and/or size of the displayed virtual representation of the first physical section of the touchpad within the virtual representation of the second physical section of the touchpad and, in response, selectively repositioning, reshaping, and/or resizing, respectively, the first physical section of the touchpad within the second physical section of the touchpad.

2. The method of claim 1, further comprising:
visually delineating the first section of the touchpad from the second section of the touchpad.

3. The method of claim 2, wherein the visually delineating further comprises:
activating a plurality of lighting elements to illuminate a plurality of points on a periphery of the first section of the touchpad.

4. The method of claim 2, wherein the visually delineating further comprises:
applying a removable template on a surface of the touchpad, wherein the removable template includes an opening corresponding to the first section of the touchpad.

5. An apparatus for assigning a position of a touchpad on a computing device, the computing device including the touchpad, a display, and a physical keyboard separating the touchpad from the display, comprising:

a component for selectively dividing the touchpad into a first physical section and a second physical section, wherein the first physical section of the touchpad is distinct from the second physical section of the touchpad, and wherein the first physical section of the touchpad is surrounded by the second physical section of the touchpad;

a component for setting the first physical section of the touchpad as an active touchpad area; and a component for setting the second physical section of the touchpad as an inactive touchpad area;

wherein the component for selectively dividing the touchpad into the first physical section and the second physical section further comprises:

a component for displaying on the display of the computing device a virtual representation of the first physical section of the touchpad within a virtual representation of the second physical section of the touchpad; and a component for selecting and adjusting a position, shape, and/or size of the displayed virtual representation of the first physical section of the touchpad within the virtual representation of the second physical section of the touchpad and, in response, selectively repositioning, reshaping, and/or resizing, respectively, the first physical section of the touchpad within the second physical section of the touchpad.

6. The apparatus of claim 5, further comprising:
a component for visually delineating the first section of the touchpad from the second section of the touchpad.

7. The apparatus of claim 6, wherein the component for visually delineating further comprises:
a plurality of lighting elements for illuminating a plurality of points on a periphery of the first section of the touchpad.

8. The apparatus of claim 6, wherein the component for visually delineating further comprises:
a removable template on a surface of the touchpad, wherein the removable template includes an opening corresponding to the first section of the touchpad.

9. A computer program comprising program code embodied in at least one non-transitory computer-readable storage medium, which when executed, enables a computer system to implement a method for assigning a position of a touchpad on a computing device, the computing device including the touchpad, a display, and a physical keyboard separating the touchpad from the display, the method comprising:

selectively dividing the touchpad into a first physical section and a second physical section, wherein the first physical section of the touchpad is distinct from the second physical section of the touchpad, and wherein the first physical section of the touchpad is surrounded by the second physical section of the touchpad;

setting the first physical section of the touchpad as an active touchpad area; and setting the second physical section of the touchpad as an inactive touchpad area;

wherein the selectively dividing the touchpad into the first physical section and the second physical section further comprises:

displaying on the display of the computing device a virtual representation of the first physical section of the touchpad within a virtual representation of the second physical section of the touchpad; and selecting and adjusting a position, shape, and/or size of the displayed virtual representation of the first physical section of the touchpad within the virtual representation of the second physical section of the touchpad and, in response, selectively repositioning, reshaping, and/or resizing, respectively, the first physical section of the touchpad within the second physical section of the touchpad.

10. The computer program of claim 9, the method further comprising:
visually delineating the first section of the touchpad from the second section of the touchpad.

11. The computer program of claim 10, wherein the visually delineating further comprises:
activating a plurality of lighting elements to illuminate a plurality of points on a periphery of the first section of the touchpad.

* * * * *